United States Patent
Ahmed

(10) Patent No.: US 10,113,584 B2
(45) Date of Patent: Oct. 30, 2018

(54) ROLLER FINGER FOLLOWER HAVING A BEARING SLEEVE FOR A FLOATING AXLE

(71) Applicant: Schaeffler Technologies AG & Co. KG, Herzogenaurach (DE)

(72) Inventor: Faheem Ahmed, Troy, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 183 days.

(21) Appl. No.: 15/282,529

(22) Filed: Sep. 30, 2016

(65) Prior Publication Data
US 2018/0094672 A1 Apr. 5, 2018

(51) Int. Cl.
*F16C 19/46* (2006.01)
*F01L 1/047* (2006.01)
*F01L 1/18* (2006.01)

(52) U.S. Cl.
CPC .............. *F16C 19/46* (2013.01); *F01L 1/047* (2013.01); *F01L 1/181* (2013.01); *F16C 2226/12* (2013.01); *F16C 2361/31* (2013.01); *F16C 2361/91* (2013.01)

(58) Field of Classification Search
CPC .. F16C 19/46; F16C 2361/91; F16C 2361/31; F16C 2226/12; F01L 1/047; F01L 1/181
USPC .......... 123/90.39, 90.5, 90.51, 90.55; 74/509
See application file for complete search history.

(56) References Cited

U.S. PATENT DOCUMENTS

| 4,628,874 A | * | 12/1986 | Barlow | B21K 1/205 |
| | | | | 123/90.27 |
| 4,796,483 A | * | 1/1989 | Patel | B21K 1/205 |
| | | | | 123/90.36 |
| 5,054,440 A | * | 10/1991 | Kadokawa | F01L 1/143 |
| | | | | 123/90.39 |
| 5,385,124 A | * | 1/1995 | Hillebrand | F01L 1/245 |
| | | | | 123/90.5 |
| 5,960,758 A | * | 10/1999 | Giannone | F01L 1/14 |
| | | | | 123/90.42 |
| 6,289,765 B1 | * | 9/2001 | Clayson, III | F01L 1/14 |
| | | | | 123/90.16 |
| 6,302,075 B1 | * | 10/2001 | Krieg | F01L 1/185 |
| | | | | 123/90.41 |
| 6,405,698 B1 | * | 6/2002 | Steinmetz | F01L 1/14 |
| | | | | 123/90.48 |
| 6,997,152 B2 | * | 2/2006 | Harris | F01L 1/053 |
| | | | | 123/90.16 |
| 7,712,443 B2 | * | 5/2010 | Gemein | F01L 1/185 |
| | | | | 123/90.16 |
| 8,061,320 B2 | * | 11/2011 | Meisborn | F01L 1/146 |
| | | | | 123/90.48 |
| 9,562,600 B2 | * | 2/2017 | Champalou | F16C 13/02 |

(Continued)

*Primary Examiner* — Jason Newton
(74) *Attorney, Agent, or Firm* — Volpe and Koenig, P.C.

(57) ABSTRACT

A roller finger follower includes a housing and a roller assembly. The roller assembly includes a roller positioned between a pair of sidewalls of the housing, an axle extending through opposing holes in the sidewalls of the housing and the roller, and preferably includes a plurality of needles positioned between the axle and the roller for rotatably mounting the roller on the axle. The roller assembly also includes a first bearing sleeve positioned in the first hole and a second bearing sleeve positioned in the second hole. Ends of the axle are respectively positioned in and rotatable relative to the first bearing sleeve and the second bearing sleeve such that the axle is rotatable relative to the housing.

11 Claims, 3 Drawing Sheets

(56) References Cited

U.S. PATENT DOCUMENTS

| | | | |
|---|---|---|---|
| 2001/0035140 A1* | 11/2001 | Fernandez | F01L 1/182 |
| | | | 123/90.15 |
| 2003/0159666 A1* | 8/2003 | Krieg | F01L 1/08 |
| | | | 123/90.16 |
| 2008/0072855 A1* | 3/2008 | Tawaf | F01L 1/185 |
| | | | 123/90.16 |
| 2009/0126527 A1* | 5/2009 | Bauman | F01L 1/18 |
| | | | 74/569 |
| 2012/0260875 A1* | 10/2012 | Moeck | F01L 1/185 |
| | | | 123/90.44 |
| 2012/0312264 A1* | 12/2012 | Mock | F01L 1/185 |
| | | | 123/90.39 |
| 2015/0233459 A1* | 8/2015 | Dupke | F16C 13/006 |
| | | | 74/569 |

* cited by examiner

ROLLER FINGER FOLLOWER HAVING A BEARING SLEEVE FOR A FLOATING AXLE

FIELD OF INVENTION

The present invention relates to a roller finger follower, and, more particularly, to a roller finger follower having a bearing sleeve for a floating axle.

BACKGROUND

Roller finger followers are valve train components which translate motion between a camshaft and a valve stem. Many roller finger followers include a roller mounted in a housing by an axle. In some instances, the axle is fixed to the housing, such as through a staking operation. One drawback of this configuration is that roller finger followers with fixed axles may experience uneven wear. For instance, more wear generally occurs on the axle at a location of highest loading or which experiences the most contact.

In order to help promote even wear distribution, some roller finger followers employ a "floating" axle. A floating axle is configured to rotate relative to the housing. The rotation changes the position of the axle during the life of the component, thereby directing wear to occur at different points around the supported periphery of the axle and promoting a more even wear distribution. Examples of floating axles are featured in U.S. Pat. Nos. 7,712,443 and 8,328,959 ("the '959 Patent").

In some configurations, such as that shown in the '959 Patent, a floating axle may be configured to rotate simply by placing the ends of the axle in holes in the housing and enlarging the ends of the axle to ensure that the axle does not slide axially out of the holes. However, several factors may lead to axles with this configuration not actually rotating during use. For example, the holes in the housing or the axle may be out-of-round or may include a high surface roughness which causes friction and inhibits or prevents relative rotation. In these situations, the axle does not rotate or gets stuck in a particular angular position, effectively producing a fixed axle which is susceptible to the uneven wear problem.

The present disclosure is directed to overcoming these and other problems of the prior art.

SUMMARY

In one aspect, the present disclosure is directed to a roller finger follower. The roller finger follower includes a housing including a pair of sidewalls connected by a transversely extending wall. The pair of sidewalls include a first sidewall with a first hole and a second sidewall with a second hole. The roller finger follower further comprises a roller assembly. The roller assembly includes a roller positioned between the pair of sidewalls, and an axle extending through the first hole, the second hole, and the roller is mounted for rotation on the axle, preferably using a plurality of needles positioned between the axle and the roller. The roller assembly further includes a first bearing sleeve positioned in the first hole and a second bearing sleeve positioned in the second hole. Ends of the axle are respectively positioned in and rotatable relative to the first bearing sleeve and the second bearing sleeve such that the axle is rotatable relative to the housing.

In another aspect, the present disclosure is directed to a valve train. The valve train includes a rotatable cam, a support member, a valve including a valve stem, and a roller finger follower. The roller finger follower is connected at one end to the support member and to the valve stem at an opposite end. The roller finger follower is configured to receive input from the cam. The roller finger follower includes a housing including a pair of sidewalls connected by a transversely extending wall. The pair of sidewalls include a first sidewall with a first hole and a second sidewall with a second hole. The roller finger follower further includes a roller assembly. The roller assembly includes a roller positioned between the pair of sidewalls, and an axle extending through the first hole, the second hole, and the roller is mounted for rotation on the axle, preferably using a plurality of needles positioned between the axle and the roller. The roller assembly further includes a first bearing sleeve positioned in the first hole and a second bearing sleeve positioned in the second hole. Ends of the axle are respectively positioned in and rotatable relative to the first bearing sleeve and the second bearing sleeve such that the axle is rotatable relative to the housing

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
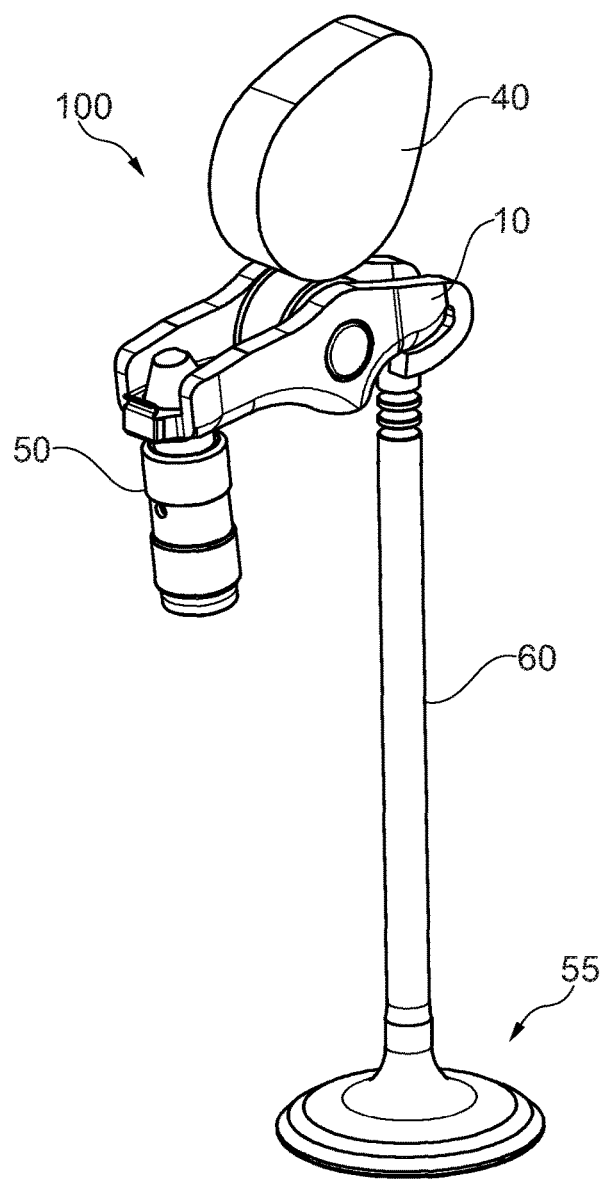
FIG. 1 is a perspective view of a section of a valve train which includes a roller finger follower.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 illustrates an exemplary section of a valve train 100. The valve train 100 may be used in conjunction with an engine, such as an internal combustion engine. The valve train 100 may include at least a roller finger follower 10, a cam 40, a support member 50, and a valve 55 including valve stem 60. The roller finger follower 10 may be connected to the support member 50 (e.g., pushrod, hydraulic lash adjuster, or the like) at one end and the valve stem 60 at an opposite end. The roller finger follower 10 may open and close a gas exchange valve based on input from the cam 40. While a single-action roller finger follower is described, it should be understood that the disclosed features may apply to other types of components, including switchable roller finger followers.

Figure 2:
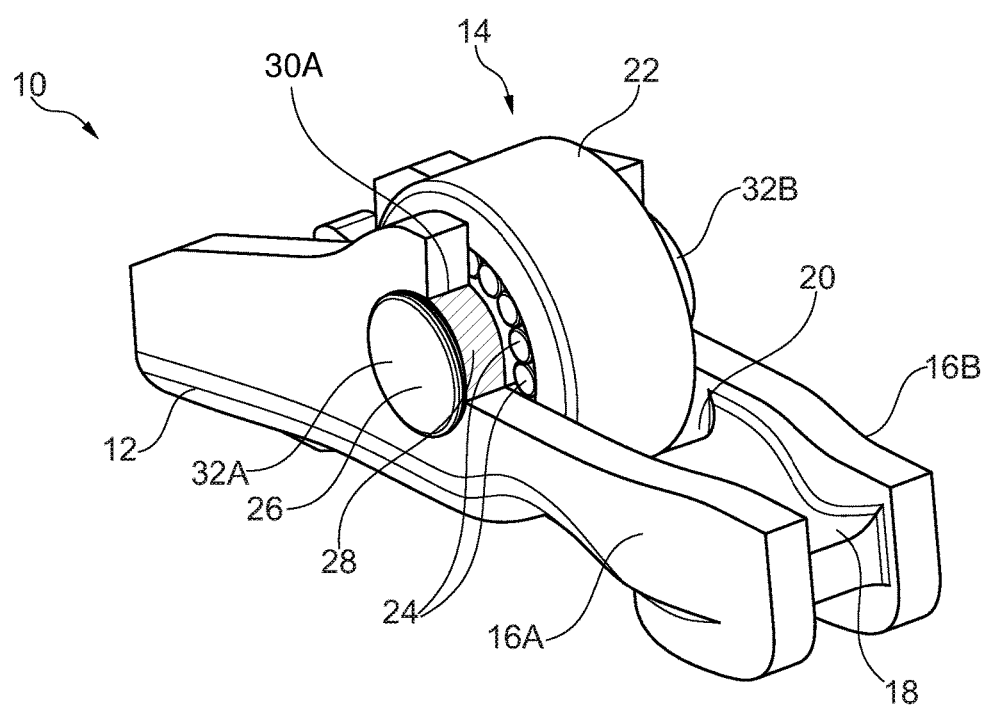
FIG. 2 is a perspective and partial cut-away view of the roller finger follower of FIG. 1.

FIG. 2 further illustrates the roller finger follower 10. In an exemplary embodiment, the roller finger follower 10 includes a housing 12 and a roller assembly 14. The housing 12 preferably includes a pair of generally parallel sidewalls 16A, 16B (i.e., a first sidewall 16A and a second sidewall 16B) connected by a transverse wall 18, which can be a lower wall such that the housing 12 has a generally U-shaped cross section, at least in areas. An opening 20 is provided in the transverse wall 18. Opposing longitudinal ends of the housing 12 may include features (e.g., connection members, recesses, fasteners) for mounting the housing 12 at one end to the support member 50 and at another end to the valve stem 60 (as part of a valve train, as shown in FIG. 1).

The housing 12 may be formed of stamped sheet metal which is formed into the disclosed shape. Alternatively, the housing 12 could be forged or machined. In embodiments in which the roller finger follower 10 is a switchable roller finger follower, the housing 12 may correspond to an inner lever.

The roller assembly 14 preferably includes a roller 22, needles 24, an axle 26, and a pair of bearing sleeves 28 (i.e., a first bearing sleeve and a second bearing sleeve). The roller 22 may be configured to interact with the cam 40 of a camshaft in order to translate motion from the cam 40 to the valve stem 60 via the roller finger follower 10. The roller 22 and needles 24 are positioned between the sidewalls 16A, 16B and at least the roller 22 extends into the opening 20. The needles 24 contact an outer race formed by the roller 22 and an inner race formed by the axle 26 such that the roller 22 is rotatably mounted on the axle 26.

The axle 26 extends through the space between the sidewalls 16A, 16B, through the roller 22 and through holes 30A, 30B formed in each sidewall 16A, 16B (i.e., through a first hole 30A in a first sidewall 16A and a second hole 30B in a second sidewall 16B). Ends of the axle 26 are respectively positioned in and rotatable relative to the bearing sleeves 28 such that the axle 26 is rotatable relative to the housing 28. In an exemplary embodiment, the bearing sleeves 28 encircle the holes 30A, 30B and form a bearing surface for the ends of the axle 26.

Figure 3:
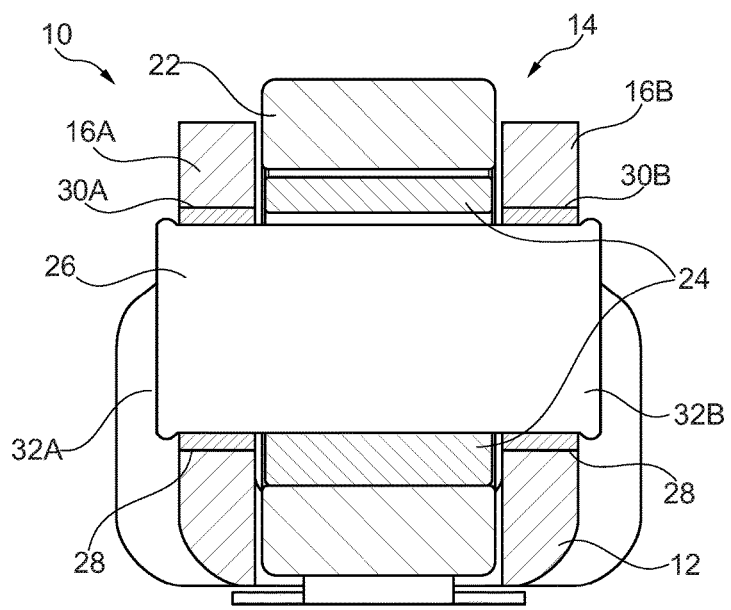
FIG. 3 is a cross-sectional view of the roller finger follower of FIG. 2, including a bearing sleeve according to a first embodiment.

FIG. 3 further illustrates the roller finger follower 10 with a transverse cross-sectional view through the center axis of the axle 26. The axle 26 is a "floating" axle in that it is configured to rotate relative to the housing 12. In some embodiments, the axle 26 includes a pair of enlarged ends 32A, 32B (i.e., a first enlarged end 32A and a second enlarged end 32B) located at outer sides, respectively, of the sidewalls 16A, 16B. The enlarged ends 32A, 32B retain the axle 26 to the housing 12 (e.g., prevent the axle 26 from sliding axially out of the roller 22 and holes 30A, 30B). In other embodiments, the axle 26 may be retained by other means. The ability of the axle 26 to rotate relative to the housing 12 promotes even wear distribution, as opposed to a fixed axle where uneven wear may occur. The bearing sleeves 28 are positioned in the holes 30A, 30B and form bearing surfaces for the axle 26 to help ensure that that axle 26 freely rotates.

The bearing sleeves 28 are preferably machined cylindrical components with precision ground internal surfaces which allow the axle 26 to rotate without hindrance. The bearing sleeves 28 may be made from a bearing grade steel alloy. The bearing sleeves 28 may include a coating and/or surface finish which facilitates rotation of the axle 26.

The bearing sleeves 28 may be retained in the holes 30A, 30B through a variety of means. In the embodiment of FIG. 3, the bearing sleeves 28 are press-fit into the holes 30A, 30B. In this embodiment, the bearing sleeves 28 may be cylindrical with a diameter that is slightly larger than that of the holes 30A, 30B. The bearing sleeves 28 may include a cylindrical height which is equal to a thickness of the sidewall 16A, 16B in the area of the hole 30A, 30B, such that the bearing sleeves 28 do not add to the overall size of the roller finger follower 10.

Figure 4:
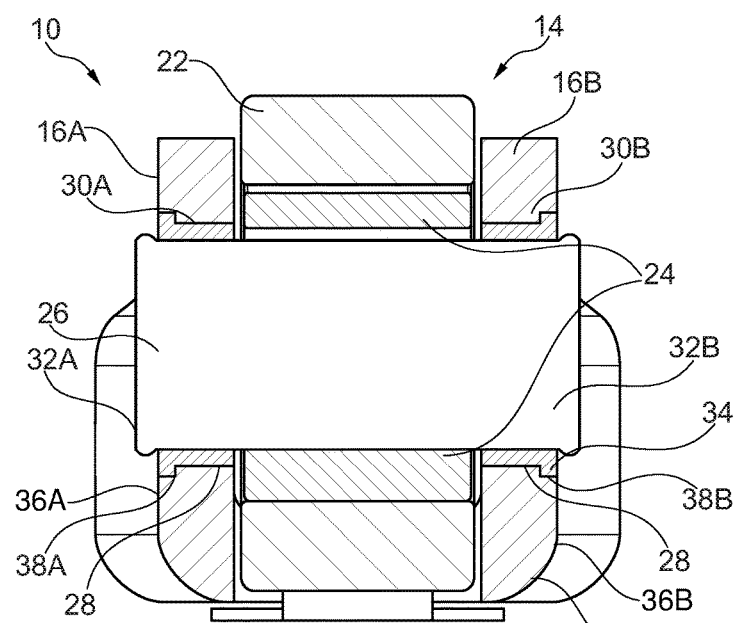
FIG. 4 is a cross-sectional view of the roller finger follower of FIG. 2, including a bearing sleeve according to a second embodiment.

In the embodiment of FIG. 4, the bearing sleeves 28 further include a retention lip 34 (i.e., a first bearing sleeve includes a first retention lip and a second bearing sleeve includes a second retention lip). Each retention lip 34 may be formed as a cylindrical flange which extends perpendicularly from an outer end of the bearing sleeve 28. In other embodiments, the retention lip 34 may include a plurality of tabs spaced around a perimeter of the bearing sleeve 28.

As shown in FIG. 4, the retention lip 34 is positioned between the sidewall 16A, 16B and the enlarged end 32 of the axle 26. In this way, the retention lip 34 prevents the bearing sleeve 28 from sliding inwardly out of the hole 30A, 30B and into the housing 12 and the enlarged end 32 prevents the bearing sleeve 28 from sliding outwardly out of the hole 30A, 30B. In this way, the bearing sleeve 28 is retained in the hole 30A, 30B as a locational fit or a slip fit (e.g., without relying on a press fit or other force applied by the housing 12 to retain the bearing sleeves).

The retention lip 34 preferably contacts an outer surface 36A, 36B of the respective sidewall 16A, 16B. In some embodiments, each sidewall 16A, 16B includes a counterbore 38A, 38B formed in the outer surface 36A 36B for receiving the retention lip 34. In this way, the retention sleeve 28 may include a cylindrical height which is equal to a thickness of the sidewall in the area of the hole 30A, 30B. In other words, the bearing sleeves 28 do not add to the overall size of the roller finger follower 10.

The disclosed roller finger follower 10 includes the bearing sleeves 28 which help to promote consistent rotation of the axle 26. This reliable rotation of the axle 26 helps to ensure that the axle is truly a "floating" axle and receives the benefits of such an axle, including even wear distribution.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein

PARTS LIST

10. Roller Finger Follower
12. Housing
14. Roller Assembly
16A. Sidewall
16B. Sidewall
18. Transverse Wall
20. Opening
22. Roller
24. Needles
26. Axle 28. Bearing Sleeve
30A. Hole
30B. Hole
32A. Enlarged End
32B. Enlarged End
34. Retention Lip
36A. Outer Surface
36B. Outer Surface
38A. Counterbore
38B. Counterbore
40. Cam
50. Support Member
55. Valve
60. Valve Stem
100. Valve Train

What is claimed is:

1. A roller finger follower, comprising:
a housing including a pair of sidewalls connected by a transverse wall, the pair of sidewalls including a first sidewall including a first hole and a second sidewall including a second hole; and
a roller assembly including:
a roller positioned between the pair of sidewalls;
an axle extending through the first hole, the second hole, and the roller rotatably mounted on the axle; and
a first bearing sleeve positioned in the first hole and a second bearing sleeve positioned in the second hole,
wherein ends of the axle are respectively positioned in and rotatable relative to the first bearing sleeve and the second bearing sleeve such that the axle is rotatable relative to the housing.

2. The roller finger follower of claim 1, wherein the bearing assembly further includes a plurality of needles positioned between the axle and the roller for rotatably mounting the roller on the axle.

3. The roller finger follower of claim 1, wherein the first bearing sleeve is press-fit into the first hole and the second bearing sleeve is press-fit into the second hole.

4. The roller finger follower of claim 3, wherein a cylindrical height of the first bearing sleeve is equal to a thickness of the first sidewall in the area of the first hole.

5. The roller finger follower of claim 1, wherein the axle further includes a first enlarged end at an outer side of the first sidewall and a second enlarged end at an outer side of the second sidewall which retain the axle to the housing.

6. The roller finger follower of claim 5, wherein the first bearing sleeve includes a first retention lip positioned between an outer surface of the first sidewall and the first enlarged end and the second bearing sleeve includes a second retention lip positioned between an outer surface of the second sidewall and the second enlarged end.

7. The roller finger follower of claim 6, wherein the first retention lip is positioned in a first counterbore in the outer surface of the first sidewall and the second retention lip is positioned in a second counterbore in the outer surface of the second sidewall.

8. The roller finger follower of claim 7, wherein a cylindrical height of the first bearing sleeve is equal to a thickness of the first sidewall in the area of the first hole.

9. The roller finger follower of claim 6, wherein the first retention lip is a cylindrical flange which extends perpendicularly from an outer end of the first bearing sleeve.

10. The roller finger follower of claim 1, wherein the housing is formed from sheet metal and the bearing sleeves are machined from a steel alloy.

11. A valve train, comprising:
a rotatable cam;
a support member;
a valve including a valve stem; and
a roller follower finger connected to the support member at one end and the valve step at another end and configured to receive input from the cam, the roller finger follower comprising:
a housing including a pair of sidewalls connected by a transverse wall, the pair of sidewalls including a first sidewall including a first hole and a second sidewall including a second hole; and
a roller assembly including:
a roller positioned between the pair of sidewalls;
an axle extending through the first hole, the second hole, and the roller rotatably mounted on the axle; and
a first bearing sleeve positioned in the first hole and a second bearing sleeve positioned in the second hole,
wherein ends of the axle are respectively positioned in and rotatable relative to the first bearing sleeve and the second bearing sleeve such that the axle is rotatable relative to the housing.

* * * * *